United States Patent

Wagner

[15] 3,703,663
[45] Nov. 21, 1972

[54] CONTROL SYSTEM FOR ADDING AND REMOVING ALTERNATORS FROM A SYSTEM

[72] Inventor: Harold H. Wagner, Peoria, Ill.
[73] Assignee: Caterpillar Tractor Co., Peoria, Ill.
[22] Filed: Sept. 10, 1971
[21] Appl. No.: 179,282

[52] U.S. Cl..................317/13 R, 307/86, 317/19, 317/26, 317/27
[51] Int. Cl...............................................H02h 7/06
[58] Field of Search ...307/85, 86, 84; 290/1; 322/69; 317/19, 13 R, 20, 27, 26

[56] References Cited

UNITED STATES PATENTS

| | | | |
|---|---|---|---|
| 3,300,648 | 1/1967 | Rockefeller | 307/86 X |
| 3,339,079 | 8/1967 | Kessler | 307/86 X |
| 3,519,883 | 7/1970 | Morey | 317/26 |

Primary Examiner—James D. Trammell
Attorney—Charles M. Fryer et al.

[57] ABSTRACT

An automatic control system for a plurality of engine powered alternator units arranged to supply a common electrical distribution system wherein the alternators are driven by speed governed engines which employs circuitry which adds or removes units as the electrical load varies, calls all non-operating units when an overload is approached and removes any malfunctioning alternator unit due to mechanical and/or electrical malfunctions in the unit by employing voltage signals from commercial load profile modules for control functions and voltage signals from the engine governors.

8 Claims, 4 Drawing Figures

INVENTOR
HAROLD H. WAGNER

3,703,663

CONTROL SYSTEM FOR ADDING AND REMOVING ALTERNATORS FROM A SYSTEM

BACKGROUND OF THE INVENTION

The present invention relates to a control system that is adapted to automatically add and remove engine powered alternator units from common electrical distribution system supplying electrical power for various uses. In particular, the system is adapted to add and remove engine powered alternator units of substantially the same electrical output capacity each of which is independently driven by a speed governed prime mover, such as internal combustion or gas turbine engine. Current day control systems for adding or removing engine powered alternator units, in systems employing a number of such units, conventionally use relatively expensive meter relays to determine the load on the system and to sequence the order in which engine powered alternator units are added or removed from the distribution system.

When utilizing meter relays to obtain an indication of the electrical power supplied by individual engine powered alternator units, there is no indication of some of the malfunctions that may occur in the prime mover since the electrical power may not be effected. For example, it is possible that the electrical power output of the engine powered alternator unit may be its proportional share of the load while the prime mover is operating in an overloaded condition to maintain the required electrical output, as a result of some mechanical engine malfunction. Under these circumstances it is possible to seriously damage the engine without a control system which will automatically remove the unit which has a malfunctioning engine from the multiple unit system and replace it with another unit.

In addition, currently available control systems make no provisions for economically "calling" all additional units when an overload condition occurs in the electrical distribution system. Thus, in prior art systems an overload in the system often requires prolonged removal of some of the non-essential loads in order that non-operating units can be started one at a time to carry some of the additional electrical load at which time a second unit will be started if the overload persists, until eventually enough units are added to handle the overload. Thereafter, the non-essential load can be re-connected to the electrical distribution system.

SUMMARY OF THE INVENTION

The present invention solves these problems by utilizing inexpensive load profile modules that provide signals indicating the actual electrical power demand of the system, as well as the electrical power being supplied by individual alternator units connected in the distribution system and uses these voltage signals, whose amplitude is proportional to true electrical power, to operate call circuits which call individual alternator units in a predetermined sequence as the electrical power demand of the system changes, to compare individual alternator output with its proportional share of the total electrical power demand on the distribution system and to control the governor setting of the prime mover of each alternator unit so that it will supply its proportional share of the load. Further, the system uses an electrical signal representing each governor setting to detect a malfunctioning prime mover so a mechanically malfunctioning unit is shut down and its electrical load shifted to another unit.

The control system also includes suitable protective circuits if the prime mover fails to start or if the alternator fails to synchronize with the system load within preset time limits so the next unit in the sequence will be called and the unit being called is shut down. Also, the system includes suitable safety devices monitoring engine oil pressure, engine fuel flow and other operating parameters of the engine so that the alternator unit may be shut down, if mechanical problems arise and its share of the load shifted to the next standby unit.

The control system may also include circuits for interchanging the operating unit and the standby units in a sequence which permits an equal distribution of the total system operating time so that all units will have substantially the same total operating times, except for those having malfunctions.

BRIEF DESCRIPTION OF THE DRAWINGS

The present invention will be more easily understood from the following detailed description of a preferred embodiment taken in conjunction with the attached drawings wherein.

DESCRIPTION OF THE PREFERRED EMBODIMENT

Figure 1:
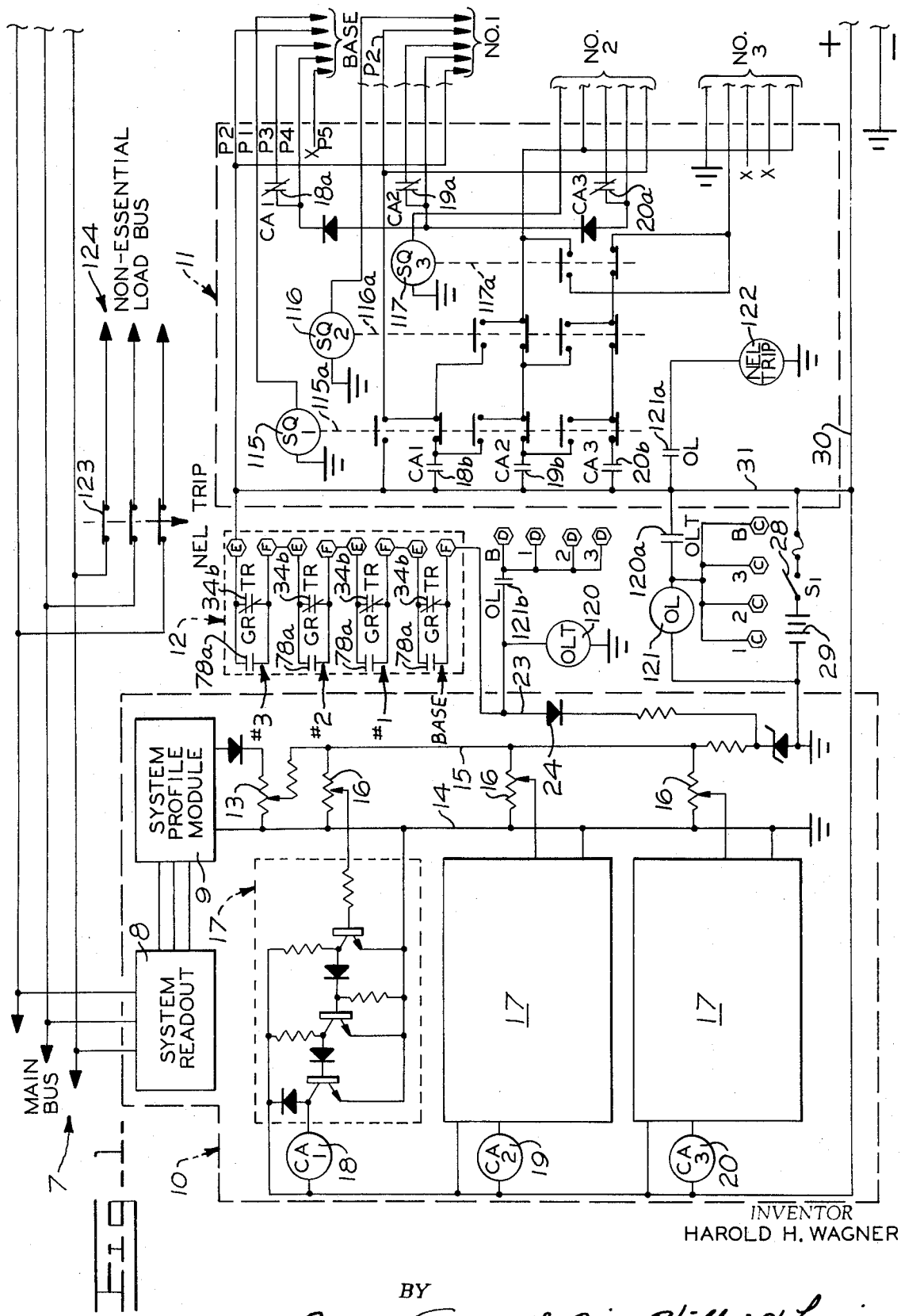
FIG. 1 is a schematic circuit drawing, partially in block form, of the master control portion of the system.
Figure 2:
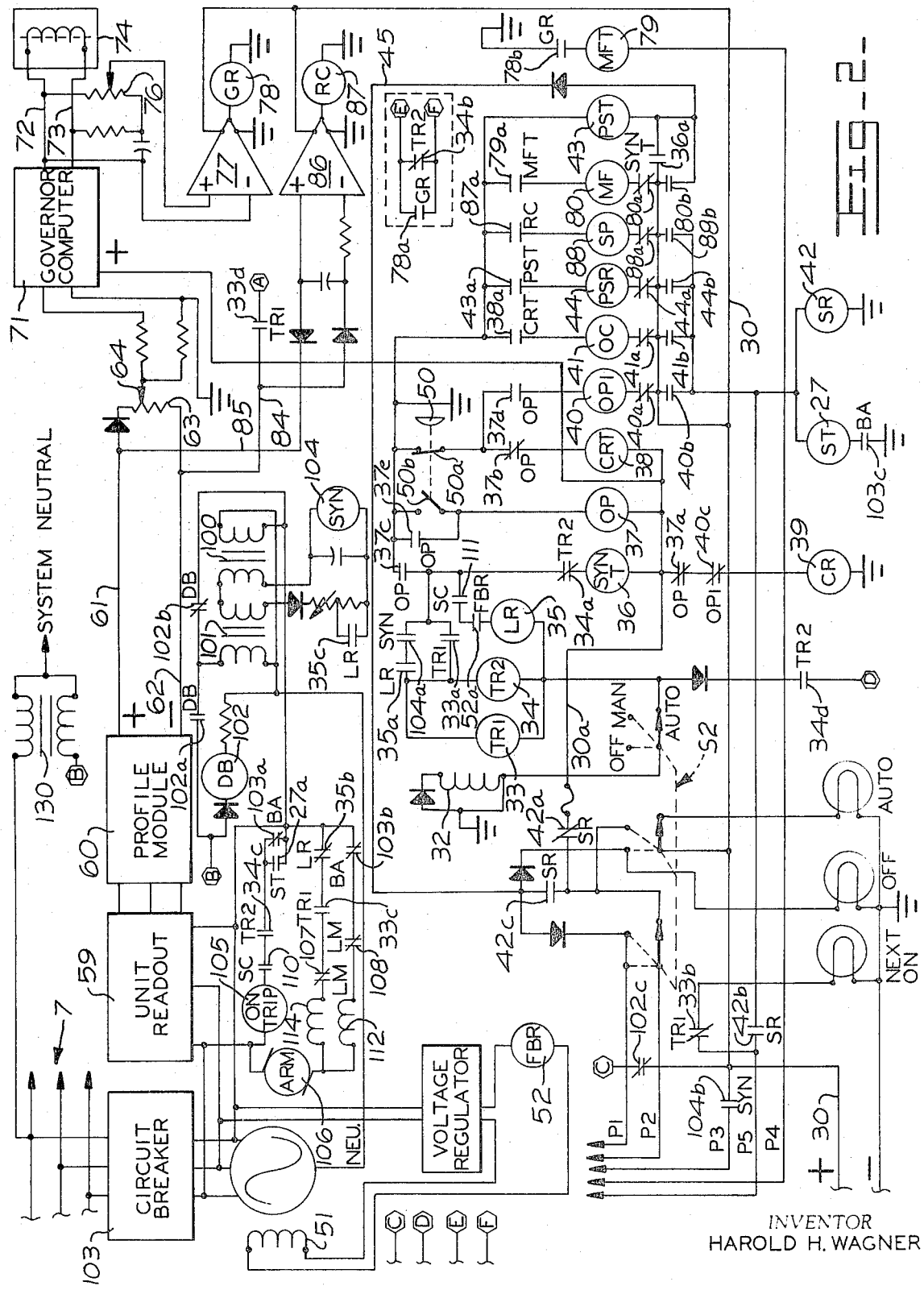
FIG. 2 is a schematic circuit drawing also partially in block diagram form, showing the unit control portion of the system one of which is utilized for each individual engine powered alternator unit.

The control system for multiple engine powered alternator units of the present invention includes two basic portions, one being the master control portion shown in FIG. 1 which sequences the addition or removal of the individual alternator units in order to meet the electrical load demand on the electrical distribution system and protect the system from electrical overloads. The other portion of the system includes a plurality of identical circuits, as shown in FIG. 2, which are the unit control circuit portions for each individual engine powered alternator unit. The illustrated master control portion of the system is designed to accept signals from four alternator unit circuits, as illustrated in FIG. 2. Since these unit circuits are identical with one another, only one need be described herein.

The master control circuit is divided into three major subcircuits; subcircuit 10 is the portion of this circuit for measuring the total power demand on the electrical distribution system and calling alternator units in sequence in accordance with power demand on the electrical distribution system; subcircuit 11 is the circuit for calling the additional engine powered alternator units in a predetermined sequence; and, subcircuit 12 is a series circuit which is designed to call all nonoperating engine powered alternator units when a system overload occurs.

Subcircuit 10 includes a system readout module 8 and a load profile module 9 both of which are coupled to the electrical distribution system bus 7. This system readout module includes instruments for monitoring the voltage, current flow, total power, power factor and other parameters commonly monitored in electrical powered distribution systems. As explained above, the load profile modules measures the true power supplied on the bus and converts it to a proportional voltage signal. Commercial, suitable load profile modules are manufactured by American Bosch Arma Corporation of Springfield, Massachusetts and the electrical signal from the module is supplied on leads 14 and 15 to the individual call circuits in the system. The voltage level to the call circuit is adjusted by employing potentiometer 13 and potentiometers 16 connected in parallel to adjust the voltage level for each individual call circuit whereby they will trigger at different voltage levels. The individual call circuit comprises an operational amplifier 17 whose output is connected to a voltage sensitive relay which is activated when the call circuit triggers. A Schmitt trigger circuit and relay may be used in place of the operation amplifier and voltage sensitive relay. Each of the call circuits shown have a voltage sensitive relay 18, 19 and 20, respectively, and which for convenience are also labeled CA-1, CA-2 and CA-3 on the drawings, and when the voltage level to the operational amplifier input exceeds a certain level, the amplifier will trigger and actuate its associated voltage sensitive relay.

Voltage sensitive relays 18, 19 and 20 can be of the delay type so that the triggering voltage level will be required to remain above the triggering levels for periods of five or so seconds before the relay will close to call a standby engine powered alternator into operation. Similarly, these relays should include delay circuits to prevent shut down until the trigger signal remains below the triggering level for a predetermined period; i.e. for 5 to 15 minutes. Utilizing time delay type relays prevents minor temporary fluctuation in electrical load from cycling the several call relays. Each of the voltage sensitive relays includes two sets of contacts, one set being closed at the time the other set is open. For example, voltage sensitive relay 18 includes normally closed contacts 18a and normally open contacts 18b which are disposed in the controls of subcircuit 11 for calling the individual units in a predetermined sequence. Similarly, relay 19 includes contacts 19a and 19b and relay 20 includes contacts 20a and 20b which function identically. Upon actuation of these relays the open contacts will close and the closed contacts will open.

The series call circuit 12 of the master unit is composed of parallel relay contacts 34b and 78a which are actually part of each individual unit control circuit portions that are connected in the same order or sequence that their associated unit is connected into the master system. Thus, each set of relay contacts provide a portion of a series connected circuit between the positive battery source and a lead 23 through a diode 24 which connects through a resistance to lead 15 from the profile module. As a result, if at least one contact is closed in each of the parallel pair of contacts a positive voltage will be supplied to lead 15 which is in excess of the voltage to actuate all of the trigger circuits in the call circuits. Thus, this will cause all of the relays 18, 19 and 20 to activate at once. This provides for a system by which all the nonoperating units are called should an overload occur in the electrical distribution system. The relay contacts are designated as 34b and 78a and each parallel set also includes designations of GR and TR to indicate that they are operated by particular relays in the individual unit control circuits described in greater detail below.

Assuming the system is shut down, the initial start-up procedure will be described with the unit control circuit illustrated in FIG. 2 plugged into the base plug of the master circuit shown in FIG. 1 and additional unit control circuits are plugged into the number 1, 2 and 3 plugs. Initially, S-1 switch 28 (FIG. 1) is closed to supply the voltage of battery 29 to the DC battery busses 30 and 31. This will cause each unit control circuit to have DC power on its extension of the battery bus 30. Before the DC busses are electrified, the S-2 switch of the base unit connected to the base plug is turned to its automatic position while all the other S-2 switches of unit control circuits 1, 2 and 3 are placed in the manual position for start-up. Thereafter units 1, 2 and 3 can be switched to their automatic mode after the base unit has been connected to the electrical distribution system, bus 7.

Referring to FIG. 2, the S-2 switch is shown in the automatic position and the initial start-up will now be discussed. With S-2 switch in "auto" position in the base unit, positive DC power will be supplied to the units secondary positive bus 30a that will supply positive power to relays 33, 34, 35, 36, 37, 38, and 39. As a result, when the switches in the relay circuits are closed connecting them to ground, these relays will actuate and operate their control contacts. Initially, the switches formed by the contacts of the several relays will be in a position as indicated in FIG. 2 and CR cranking relay 39 will commence cranking the engine and the CRT cranking relay timer 38 will commence timing the cranking cycle of the engine. During this cycle, if the engine fails to start, the timer after 30 seconds will close contacts 38a to relay 41 which will activate to open contacts 41a and close contacts 41b. This relay is a latching type so it will remain with contacts 41b closed until reset. Closing contacts 41b will connect the SR shut down relay 42 to the DC bus and its activation will open contacts 42a and close contacts 42b and 42c. Opening contacts 42a will disconnect the positive power from the secondary bus 30a and thus to all relays 33, 34, 35, 36, 37, 38 and 39 as well as deactivate the fuel solenoid 32 shutting down the engine. Further closing of contacts 42c will put positive DC bus voltage on lead P-1 which will drop the unit from the sequence operating the SQ sequencing relay 115 (FIG. 1).

If the engine starts within 30 seconds, an oil pressure switch 50 will connect relay 37 to ground through switch 50b which will actuate this relay and open contacts 37a and 37b, and close contacts 37c and 37e. As a result, the cranking relay timer will be deactivated prior to its 30 second run out and the cranking relay 39 will disengage stopping the cranking of the engine while the synchronizing timing relay 36 will be activated and commence timing the end of the preselected interval for reaching electrical synchronization with loads on the primary distribution bus 7. Contacts 37d will also be closed by actuation of relay 37 but since the pressure switch opens contacts 50a as it closes switch 50b relay 40 will not actuate to shut down the system as previously described by closing contacts 40b and opening contacts 40a and 40b which would actuate the shut down relay 42. If oil pressure is lost, however, contacts 50a will close activating this relay and the shut down relay 42. Contacts 37e latch relay 37 on when oil pressure is lost preventing a start recycle.

When the base unit starts it will be directly connected to the power bus 7 to supply the load as soon as its voltage builds up. If the generator field 51 is under excited the base unit voltage does not build up to an appropriate value and the field relay 52 will not operate. Contacts 52a thus will not close to operate load relay 35, hence relays 33 and 34 cannot operate and the circuit breaker controls will not function to connect the unit to the system bus. The synchronizing timer 36 therefore remains energized to time out after sixty seconds and actuate to close its contacts 36a to energize the PST power shut down relay timer 43. After 3 minutes this relay will actuate to close contacts 43a to energize the power shut down relay 44 which will operate to open contacts 44a and close contacts 44b which will power the shut down relay 42, previously described, which will shut down the engine.

Relays similar to 40, 41 and 42 can be employed with similar associated circuitry to handle temperature overloads or other malfunctions in the units engine circuitry to protect the unit from damage and need not be described.

When the base unit is started, there is no power on bus 7 and therefore circuit breaker 103 can be closed immediately powering the bus through the three phase alternator of the base unit when its voltage is built up and the circuit breaker is armed for closing. When field 51 is properly excited relay 52 will operate closing its contacts 52a to actuate load relay 35 through spring contacts 111 which are closed when the circuit breaker is armed. This will close contacts 35a and 35c. Since there is no power in the main bus the dead bus relay 102 will have its contacts 102b and 102c closed with its contacts 102a open which will allow synchronizing relay 104 to operate, closing its contacts 104a and 104b, when contacts 35c close. As contacts 104a close relays 33 and 34 are actuated to cause contacts 33a 33c, 33d, 34c and 34d to close while contacts 33b, 34a and 34b will be opened. Relays 33 and 34 are latched in the actuated position by the closing of contacts 33a and the opening of contacts 34a will cut off the synchronizing timing relay 36 preventing activation of the shut down relay 42 at the end of the predetermined timed cycle.

As the primary bus becomes powered, the dead bus relay 102 will be activated and its contacts 102a and 102c will be closed and its contacts 102b will be opened. Further, this activation will take place in all the other unit control circuits since the primary bus will be powered and activate their dead bus relays. With contacts 102b opened, transformers 100 and 101 will be powered one from the alternator coming on the line and one from the bus 7 by connection B. The connection B is energized from one phase of the system bus by a transformer 130. When this occurs in the base unit, the relay 35 has already closed its contacts 35c permitting actuation of synchronizing relay 104 and therefore the actuation of the dead bus relay 102 is not of consequence. However, as to the subsequently activated alternators, transformers 100 or 101 will be supplied with voltages as indicated above. As a result, it is necessary for the two transformers to be in phase before the synchronizing relay 104 will operate to actuate relay 105 and avoid shutdown at the end of the period measured by the synchronous timer. Once synchronization is obtained, the circuit breaker power unit 105 will close circuit breaker 103 adding the alternator unit to the distribution bus 7. The motor armature 106 is used for arming or tensioning the spring used for powering the circuit breaker. When an oncoming unit is started the circuit breaker spring, not shown, is armed for closing by a circuit consisting of breaker auxiliary contacts 103b, travel limit contacts 108, field winding 112 and armature 106 across a single phase of the alternator output. When the spring is armed spring contacts 110 and 111 will be closed and travel limit contacts 107 and 108 will be opened thereby stopping rotation of armature 106. When the oncoming unit is up to voltage and synchronized relays 33, 34 and 35 are actuated as previously described causing contacts 33 c and 34c to close and contacts 35b to open. When contacts 34c close an actuating circuit is completed for circuit breaker power unit 105 through the closed spring contacts 110 and breaker auxiliary contacts 103a and this unit will release the armed circuit breaker spring to close circuit breaker 103.

When the circuit breaker closes, spring contacts 110 and 111 and breaker auxiliary contacts 103a and 103b are opened and travel limit contacts 107 and 108 reclose. Opening spring contacts 111 causes load relay 35 to temporarily restore permitting contacts 35b to reclose. This action again powers armature 106 through field winding 114, contacts 107, 33c and 35b to arm the circuit breaker spring in a direction to cause the circuit breaker to open when called for by the controls. When the spring is armed for opening, contacts 107 and 108 will again be opened and spring contacts 110 and 111 are again closed. A shunt trip relay 27 in the unit controls is conditioned by the closing of breaker auxiliary contacts 103c when the circuit breaker is closed and this relay will operate simultaneously with relay 42 in any subsequent shut down operation. Shunt trip relay operation closes contacts 27a completing a circuit to circuit breaker power unit 105 which releases the armed circuit breaker spring to open circuit breaker 103. The circuit breaker and its drive system are commercially available units.

Assuming the particular unit is not shut down for any one of the reasons discussed above, as it is connected to the bus, the unit readout system 59 will provide information to the profile module 60 whose output will be proportional on lead 61 and 62 to the true power being generated by the alternator. Leads 61 and 62 are connected across the potentiometer 63 and its output 64 is employed in the governor computer control 71. The governor computer 71 is of a commercial integrated circuit type such as that built by American Bosch Arma Corporation, and known as type 564 whose output can be sent over leads 72 and 73 to the governor actuator 74. The governor actuator 74 actually controls position of the engine throttle unit and therefore its speed. The signal on leads 72 and 73 actually represent a signal related to total engine output and a signal taken across a voltage divider network 76 is sent to an operational amplifier 77 for a control parameter. Since the governor setting for full engine output is known, if the signal to operational amplifier 77 becomes greater than full power, the operational amplifier will trigger and operate governor relay 78 which will close contact 78a in the series circuit 12 (FIG. 1) for its unit and also close contacts 78b which will activate the malfunction timer relay 79. This malfunction relay is a timing relay and after 20 seconds, if it is still activated it will close contact 79a activating latching malfunction relay 80 which then will close contacts 80b and open 80a. This will energize the power shutdown relay 43 and simultaneously put positive battery on lead 45 which is communicated via lead P-1 to sequence relay 115 (FIG. 1) to start the next unit. After three minutes relay 43 will actuate and close contacts 43a causing the power shutdown relay 44 which is the latching type to close contacts 44b and open contacts 44a, thereby powering shutdown relay 42 which will shut down the unit as previously described.

The individual unit control system also includes a reverse current protector circuit similar to the protective circuit for improper governor and power output relationships. The reverse current protection circuit prevents an alternator from operating like a motor when it fails to deliver the appropriate amount of power while it is connected to the power bus 7. This will occur only when the system is being supplied by two or more alternator units and when one fails to deliver any power. Under such circumstances, it is driven as a sychronous motor by other alternator units with the higher power output. If such reverse current flow occurs, the output of the profile module will change polarity which will be reflected in leads 85 and 84 which connect to an operational amplifier 86. This amplifier will trigger if the output of the profile module assumes the negative value and will actuate reverse current relay 87. Actuation of reverse current relay 87 will close contacts 87a which will cause the special purpose latching relay 88 to close its contacts 88b and open its contacts 88a thereby actuating the shutdown relay 42 whose operation has been previously described.

Operational amplifiers 77 and 86 are relatively low cost units, such as that manufactured by Sensitac Instrument Corporation in Manchester, New Hampshire, which include the adjustable operational amplifiers that permit triggering at any input level of either a positive or negative value. Through the utilization of the above circuits, it is possible to substitute these relatively low cost units for the conventional reverse current power relay and measuring devices used to detect such malfunctions in conventional control system of this type. Further, the arrangement detects a malfunction determining if a particular unit is supplying its proportional share of the load as related to an engine governor position. This is a more accurate indication of the proper functioning of the unit than measurements such as fuel flow or actual power being supplied by the alternator, used separately.

After the base unit has been coupled to the system, it will supply power until the load on bus 7 increases to a point approaching that of the capacity of the base engine power and alternator unit. This situation will be indicated by the voltage from the system profile module increasing as the true power output of the unit increases. When the voltage point set by potentiometer 16 is reached call relay 18 will be actuated due to the triggering of the call circuit 17 associated. Actuation of this call relay will cause contact 18b to close and contacts 18a to open. As a result of the changing of these contacts, lead P2 of the engine powered alternator unit connected to position 1 (shown in FIG. 1) will be powered through its switch S-2. Of course, after the base unit has been connected to the bus 7, the switches S-2 in the remaining units are shifted to the automatic position so the above sequence will automatically occur.

Referring to both FIGS. 1 and 2, it can be seen that as switch S-2 if placed in either the manual or the off position will supply positive power through lead P1 to sequencing relay (SQ-1) 115 which will cause its plurality of contacts controlled by actuator 115a to shift the contacts in call circuits 11. As a result of this contact shift, the unit connected to position 1 is removed from the sequencing operation. Further, it should be appreciated, that should a malfunction occur whereby the synchronous timer relay 36 of one of the units actuates its contacts 36a a positive power will be supplied through lead 45 back through the lead P1 to sequence the sequence relay associated with that particular unit. Thus, in the instant case, should the base unit malfunction sequence relay 115 will shift to remove this unit from further operation in the circuit. Similarly, if the unit connected to the 1 position of FIG. 1 has a malfunction or is switched to manual, it will operate sequencing relay 116 whose actuator 116a will reposition its contacts to remove this unit from further operation. Similarly, the unit connected to position 2 would likewise power lead P1 which would operate sequencing relay 117 whose actuator 117a would remove this unit from the circuit. With all the units operating normally, the sequencing relays described above would be in a position shown in FIG. 1.

Figure 3:
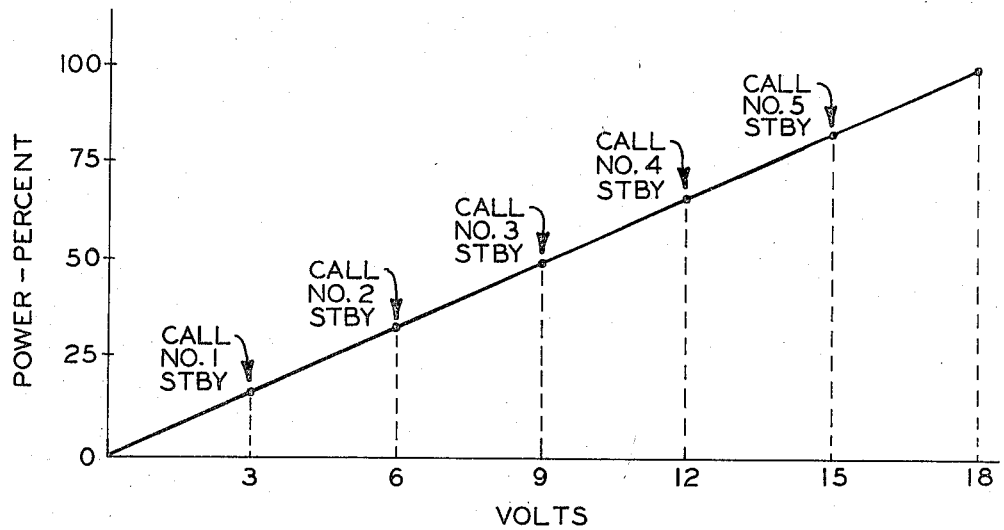
FIG. 3 is a plot of the voltage output versus percent of system load supplied as a signal from the commercially available load profile module.
Figure 4:
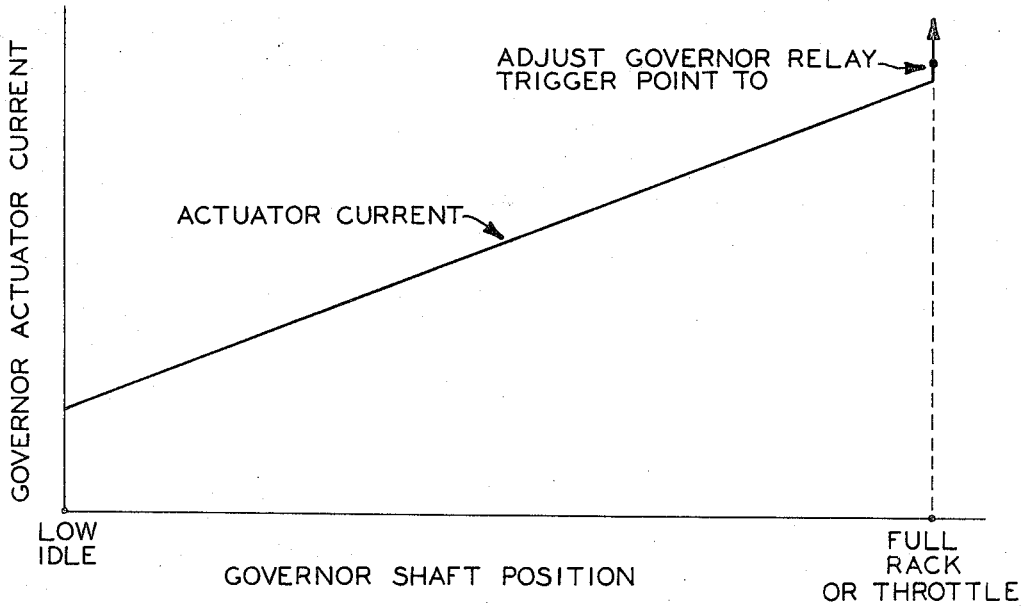
FIG. 4 is a plot of governor shaft position versus governor actuator current which is employed as a control parameter in the control system.

Referring to FIG. 3, a voltage versus power trace is shown for the system profile module with the voltage line having spaced indications thereon where, through adjustments of potentiometers 16 of the various call circuits 17, the alternator units will be actuated. Thus, as the true power, converted to volts, increases due to increased power demands on the system, the individual units will be called in order and added to the distribution bus 7 to avoid an overloaded condition. In the particular voltage curve shown, the individual call circuits or amplifiers 17 operate on increments or steps of 3 volts.

This system employing a voltage signal proportional to true power is an improvement over prior art systems that use complicated mechanical arrangements in order to call the standby units as the load increases. Since the voltage curve is available which represents the true power demand on the circuit it can also be employed to remove units from the system and as the voltage of the system profile module drops toward zero, units will be removed from the system until only the base unit remains.

It is to be appreciated that these units which are operating have both parallel contacts 34b and 78a in the open position since actuation of relay 34 when the alternator comes on the line will open contacts 34b. However, the units which are not operating will have at least one of their parallel contacts, in this case 34b, closed which will complete the series circuit except for the operating unit or units which have their pairs of contacts open. If an overload occurs, the operational amplifier 77 will trigger the governor relays 78 of all operating units and this will cause the contacts 78a of the operating units to close thereby completing the series circuit. As this occurs, the positive voltage will be applied to lead 15 and all call circuits will be simultaneously actuated since the voltage is set above the 15 volts required to activate all call circuits 17. As a result, call relays 18, 19 and 20 may be actuated to start and bring all nonoperating units up to speed and eventually parallel them with the power distribution bus 7 when they reach synchronization. Of course, since the initial closure of the governor relay only activates a three minute malfunction timer, it is possible for the system to continue to operate before a shutdown of the operating units experiencing the overload occurs. Further, if the overload condition is corrected prior to the timing of the malfunction timer relay 79 the overload condition may correct itself and none of the operating units will shut down.

The voltage that triggers the series call circuit 12 also operates the overload timing relay 120. The overload timer relay can be set for any desired time delay, for example eight seconds, after which it will operate the overload relay 121 by closing contacts 120a. When the overload relay is actuated, it closes contacts 121a which causes the non-essential trip 122 to trip its breaker 123 which disconnects the non-essential load bus 124 from bus 7. The overload relays will also close contacts 121b connecting the battery bus voltage to relay 120 through the terminals D in FIGS. 1 and 2. This maintains the overload timer in the on position until reset as long as any unit bus is connected to the distribution bus 7 and prevents reclosure of the non-essential load trip 122 until all units are running and coupled to the bus 7. If the overload timer was not powered from the battery, it would be possible for the series circuit 12 to be broken when the non-essential load was removed and the governor of any operating unit caused its associated relay 78 to be deenergized. This would remove the battery voltage from the call circuits and non-operating units would not be started.

Once all the non-operating units are started and synchronized with the common load bus 7, the positive power will be removed from the call circuits since the series circuit 12 will be broken by the opening of all 34b contacts. The overload relay timer 120 will then be de-energized and the non-essential load breaker will reclose. The system will then be operating normally and the call circuits will then be controlled according to the power demand on the system. If the load is decreased to a point where all units are not needed, then all the units will continue to run until the call circuits are reset, for example, 15 minutes. The call circuit will then start shutting down units in the predetermined sequence until the proper balance of the operating units and system load is reached.

From the above description it is seen that in the case of an overload all units are called simultaneously and synchronized with the load before the non-essential load is restored. When the non-essential load is restored, the number of operating units are balanced with the system load demand by the call circuits.

OPERATION

In order to start the system with all units shut down, it is necessary to switch all of the units to manual except for the selected base operating unit which is switched to automatic. Switch S-1 is then closed which applies positive power to the base unit through the switch S-2 to initiate the timed starting sequence. It is assumed that the base unit starts and oil pressure and other necessary functions are normal so that the unit is not shut down by the operation of a cranking timer or the other safety devices. When the unit is up to operating voltage the synchronizing circuit will operate to close the circuit breaker and couple the operating base unit to the system load bus 7. As explained, the dead bus relays DB of all units will not be energized when no unit is supplying the system and the two synchronizing transformers 101 and 100 will be supplied directly from the operating unit. This insures that the initially started or base unit will be coupled to the system load when its voltage builds up. When the base unit has been coupled to the system load, it will energize the dead bus relay to couple the transformers 101 of all units to the system neutral. Thus, additional units must synchronize with the system load bus before they are coupled to the system load. The base unit will energize the relays 33 and 34 to reposition all their associated contacts and break the series circuit 12.

After the operating unit has been on the line for at least the reset cycle of the call circuits, for example, 15 minutes, the remaining switches S₂ of the non-operating units can be set to the automatic position and additional units will not start unless the system is overloaded. If the call circuits are not reset prior to switching standby unit controls to automatic, the non-operating units would immediately go through their starting cycles and synchronizing themselves with the system load. This, of course, results from the fact that the call circuits contacts would be closed and apply positive power to the starting circuits of all non-operating units.

As the load of the system increases, the system load profile module 9 will monitor the increase and supply a voltage signal to the call circuits. When the voltage reaches the operating level of the first call circuit relay 18 will energize and close the contacts 18a and open contacts 18b. This will supply positive power to the first standby unit which will then start as set forth above. When the standby unit is up to operating speed, it will synchronize with the system load since the dead bus relay will be energized and the DB contacts 102a will be closed while the contacts 102b will be opened. This will insure that the transformer 100 is energized from one phase of the standby unit while the transformer 101 is energized from the synchronizing bus. When the two transformers are synchronized, the synchronizing relay 104 will close and close the contacts 104a. This in turn will cause the circuit breaker 103 of the standby unit to close and couple it to the system bus 7.

The above sequence will be continued as long as the system load gradually increases or decreases. Of course, if a sudden overload should occur the overload relay 121 will be energized as a result of the series circuit 12 being completed by the closure of all contacts 78a of the operating units. This will immediately apply positive voltage to all call circuits of a sufficient magnitude to call all non-operating units. The non-operating units will then start and synchronize with the system as explained above. When all units have been started and synchronized with the system load, the overload relay will be de-energized and the non-essential load restored. After resetting the call circuits, they will take over their normal function and shut down the operating units until the number of operating units corresponds with the magnitude of the system load.

In the case of any malfunction in any operating unit, its associated malfunction timer 79 will be energized which in turn will energize the shutdown relay 42 to shut the unit down by opening contacts 42a and shift its share of the load to the next non-operating standby unit. This will be accomplished by applying positive power to the terminals P1 in FIG. 2 which in turn will operate the appropriate sequence relay in FIG. 1. While the malfunction may be a typical one, such as low oil pressure, high temperatures and the like, it can also be the case where measured parameters are normal but the unit is not supplying its proportional share of the load. In this case, the voltage sensitive amplifier 77 will be energized by the increased current supplied to the governor positioning coil 74. This will energize the governor relay 78 which will close the contact 78b to start the malfunction timer 79. If the malfunctioning engine does not cure itself within the timer's normal operation of 20 seconds, the shutdown relay 42 will be energized which in turn shut down the unit and shift its load to the next standby unit.

If any base unit is called and fails to start, the crank timer 38 will time out in 30 seconds and the oil pressure switch 50 will not close. When the crank timer times out, it closes contacts 38a to energize relay 41. This will open the contact 41a and close the contact 41b to apply the positive power to the shutdown relay 42. This in turn opens the contact 42a to shut off the fuel to the engine and interrupt the power to the crank solenoids, and close the contact 42b to apply positive power to the line P1 which is coupled to the sequencing relay of the next non-operating or standby unit No. 1. For example, if the base unit failed to operate the line P1 would be coupled to the sequence relay 115 in FIG. 1. This would energize the sequence relay 115 which would close the contacts 115a and apply positive battery to the line P2 of the next unit. This would start the standby unit which in turn would place positive battery on the next on light of the next sequenced unit.

While the invention has been described with relation to internal combustion engine prime movers, it can be applied to any type of prime mover that can be automatically started. Also while specific sensitive relays and load profile modules have been given, others may be used if they are capable of operating in a similar manner.

I claim:

1. A control system for a plurality of separately engine driven alternator units supplying a common electrical distribution system wherein at least one of said units acts as a base unit initially energizing said electrical distribution system comprising:
    a master circuit;
    a plurality of identical unit circuits coupled to said master circuit, one of said unit circuits associated with each of said engine driven alternator units;
    electrical load sensing means connected to said distribution system to measure electrical power being supplied by said system and coupled to said master circuit;
    call circuit means connected to receive an output from said load sensing means, said call means being connected through in said master circuit to each unit circuit and operable to progressively activate and deactivate said unit circuits in relation to electrical load measured by said load sensing means;
    unit starting means in each unit circuit coupled to its controls for its associated engine driven alternator unit operable to start its associated engine when its unit circuit is activated by said call circuit means;
    unit shut-down means in each unit circuit coupled to its controls for its associated engine driven unit operable to shut down its associated engine when its unit control circuits are deactivated;
    malfunction circuit means in each unit circuit connected to separately activate said shut-down means with its unit circuit activated, said malfunction circuit means including a unit load profile module connected to measure the electrical power output of its associated alternator and governor amplifier with a comparator connected to receive the outputs of said load profile module and said governor amplifier whereby disparity between the operation of its engine and its alternator output will produce a malfunction signal, and
    sequencing means in said master circuit connected to each malfunction circuit means operable to remove any unit from operation when a malfunction occurs in its malfunction circuit means.

2. The control system defined in claim 1 wherein the master circuit includes a circuit capable of activating all the standby engine alternator units when the electrical load exceeds a predetermined level.

3. The control system defined in claim 1 wherein the load distribution system includes a main bus and a non-essential bus and the master circuit includes a normally closed relay circuit connecting said non-essential bus to said main bus and a load circuit opening said relay circuit when the electrical load exceeds a predetermined level.

4. The control system of claim 1 wherein said call circuit means comprises a plurality of parallel circuits including amplitude sensitive means responsive to the amplitude of the load as measured by a load sensing means in said master circuit; said parallel circuits being adjusted to operate in sequence as said load varies.

5. A control system for shutting down one of a plurality of engine driven alternator units in response to a malfunction in said one unit comprising:
    a load measuring means, said load measuring being disposed to measure the true power being supplied by the alternator of each unit and supply a signal related thereto;

a governor, said load measuring means being coupled to said governor to position said governor and said governor being disposed to control said engine; and a malfunction detecting means being coupled to said governor to measure the setting of said governor and compare it with said signal representing the true power of its alternator, said malfunction detecting means being disposed to operate whenever the comparison gives an improper relationship to shut down said unit.

6. The control system of claim 5 wherein the engine driven alternator units supply a common load, said control system including means for generating a signal representing the portion of the common load to be carried by each unit coupled to the load, said governor including means for comparing the portion of the load to be carried by a unit with the true power being supplied by each unit, said governor controlling its engine so that its unit supplies its portion of the load.

7. The control system of claim 6 wherein said governor includes a governor control coupled to the load measuring means and disposed to supply an electrical signal to the governor to set said governor, said malfunction detecting means comprising circuit means responsive to the amplitude of said electrical signal to operate when said amplitude exceeds a preset maximum.

8. The control system of claim 7 wherein said malfunction detecting means also includes means to call all non-operating units when said load measuring means senses a system overload.

* * * * *

UNITED STATES PATENT OFFICE
CERTIFICATE OF CORRECTION

Patent No. 3,703,663      Dated  November 21, 1972

Inventor(s)  Harold H. Wagner

It is certified that error appears in the above-identified patent and that said Letters Patent are hereby corrected as shown below:

In Fig. 2, the intersection of the wires close to relay contacts 42a and adjacent to the fuse connected therewith should include a dot so that these wires are conductively connected, therby connecting both solenoid coil 32 and lead 30a to the fuse. Also, the extra lead connecting the fuel solenoid coil 32 directly to ground should be deleted. Below is illustrated the central portion of Fig. 2 with these changes incorporated therein.

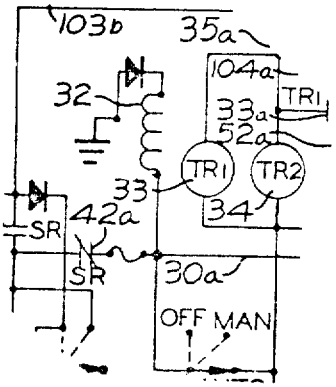

Signed and sealed this 17th day of September 1974.

(SEAL)
Attest:

McCOY M. GIBSON JR.             C. MARSHALL DANN
Attesting Officer               Commissioner of Patents